(12) United States Patent
Chow et al.

(10) Patent No.: US 9,193,447 B2
(45) Date of Patent: Nov. 24, 2015

(54) LANDING GEAR WITH NOISE REDUCTION APPARATUS

(75) Inventors: Leung Choi Chow, Bristol (GB); Christopher Neil Wood, Congleton (GB); Philip Campbell, Stockport (GB)

(73) Assignee: Airbus Operations Limited, Bristol (GB)

( * ) Notice: Subject to any disclaimer, the term of this patent is extended or adjusted under 35 U.S.C. 154(b) by 544 days.

(21) Appl. No.: 12/926,796

(22) Filed: Dec. 9, 2010

(65) Prior Publication Data

US 2011/0139926 A1 Jun. 16, 2011

(30) Foreign Application Priority Data

Dec. 16, 2009 (GB) .................................. 0921960.1

(51) Int. Cl.
*B64C 25/14* (2006.01)
*B64C 25/10* (2006.01)
*B64C 25/16* (2006.01)
*B64C 25/00* (2006.01)

(52) U.S. Cl.
CPC ................. *B64C 25/10* (2013.01); *B64C 25/16* (2013.01); *B64C 2025/003* (2013.01)

(58) Field of Classification Search
USPC .......... 244/102 R, 102 A, 101, 100 R, 103 R, 244/104 FP; 301/124.1, 137; 676/160, 161; 403/160, 161
See application file for complete search history.

(56) References Cited

U.S. PATENT DOCUMENTS

| 4,576,347 | A | * | 3/1986 | Opsahl | 244/130 |
|---|---|---|---|---|---|
| 6,048,477 | A | | 4/2000 | Thorpe et al. | |
| 6,619,587 | B1 | * | 9/2003 | Chow et al. | 244/100 R |
| 6,786,451 | B2 | | 9/2004 | Courtois et al. | |
| 7,458,542 | B2 | * | 12/2008 | Chow et al. | 244/102 R |
| 7,484,688 | B2 | * | 2/2009 | Chow et al. | 244/100 R |
| 7,954,757 | B2 | * | 6/2011 | Moe et al. | 244/100 A |
| 8,083,182 | B2 | * | 12/2011 | Cacciaguerra | 244/129.4 |
| 2003/0102406 | A1 | * | 6/2003 | Chow et al. | 244/100 R |
| 2003/0164423 | A1 | * | 9/2003 | Courtois et al. | 244/102 R |
| 2006/0102775 | A1 | * | 5/2006 | Chow et al. | 244/1 N |
| 2006/0243856 | A1 | * | 11/2006 | Chow et al. | 244/103 R |
| 2008/0142634 | A1 | * | 6/2008 | Moe et al. | 244/1 N |
| 2009/0176078 | A1 | | 7/2009 | Seror et al. | |
| 2011/0127377 | A1 | * | 6/2011 | Prud'Homme-Lacroix | 244/109 |
| 2011/0139926 | A1 | * | 6/2011 | Chow et al. | 244/1 N |

FOREIGN PATENT DOCUMENTS

| WO | 01/04003 | 1/2001 |
|---|---|---|
| WO | 2004/039671 | 5/2004 |
| WO | WO 2004/089744 | 10/2004 |

OTHER PUBLICATIONS

Great Britain Search Report for GB Application No. 0921960.1, dated Apr. 15, 2010.

\* cited by examiner

*Primary Examiner* — Timothy D Collins
*Assistant Examiner* — Medhat Badawi
(74) *Attorney, Agent, or Firm* — Nixon & Vanderhye P.C.

(57) ABSTRACT

An aircraft landing gear assembly comprises a landing gear (10) arranged to be moveable between a stowed position and a deployed position. The assembly includes a removably mounted cover plate (20) that covers a void (12) defined by a part of the landing gear assembly. The plate (20) may have a substantially constant thickness, one or more fixing elements (22) on one side only of the plate, and a sealing element (34) that extends around substantially the entire perimeter (20*a*) of the plate (20).

20 Claims, 10 Drawing Sheets

LANDING GEAR WITH NOISE REDUCTION APPARATUS

This application claims priority to Great Britain Application No. 0921960.1, filed 16 Dec. 2009, the entire contents of which is hereby incorporated by reference.

The present invention relates to an aircraft landing gear and noise reduction assembly. More particularly, but not exclusively, the invention relates to an aircraft landing gear assembly designed to reduce the noise generated by the interaction of the landing gear and the air flowing past it during flight, landing and/or take-off.

BACKGROUND OF THE INVENTION

It is desirous to reduce the noise generated by aircraft, for example, to lessen disruption or inconvenience, resulting from aircraft noise, caused to the public on the ground near airports. A significant amount of noise is generated by the interaction of the aircraft and the air flowing past it, which results in turbulent flows and consequently noise. It is particularly important to reduce noise created during approach of the aircraft on landing. During approach, a significant contribution to the amount of noise that the aircraft generates is made by the landing gear, which is typically deployed early for landing for safety reasons. The deployment of the landing gear increases drag and assists deceleration of the aircraft. During take-off, noise from the landing gear is a less significant factor because engine noise is generally greater and because the landing gear is generally stowed at the earliest opportunity to reduce drag and aid take-off. During normal flight, the landing gear of an aircraft is typically stowed in a landing gear bay, the bay being closed off by doors so that no part of the landing gear is subjected to the airflow.

Figure 1A:
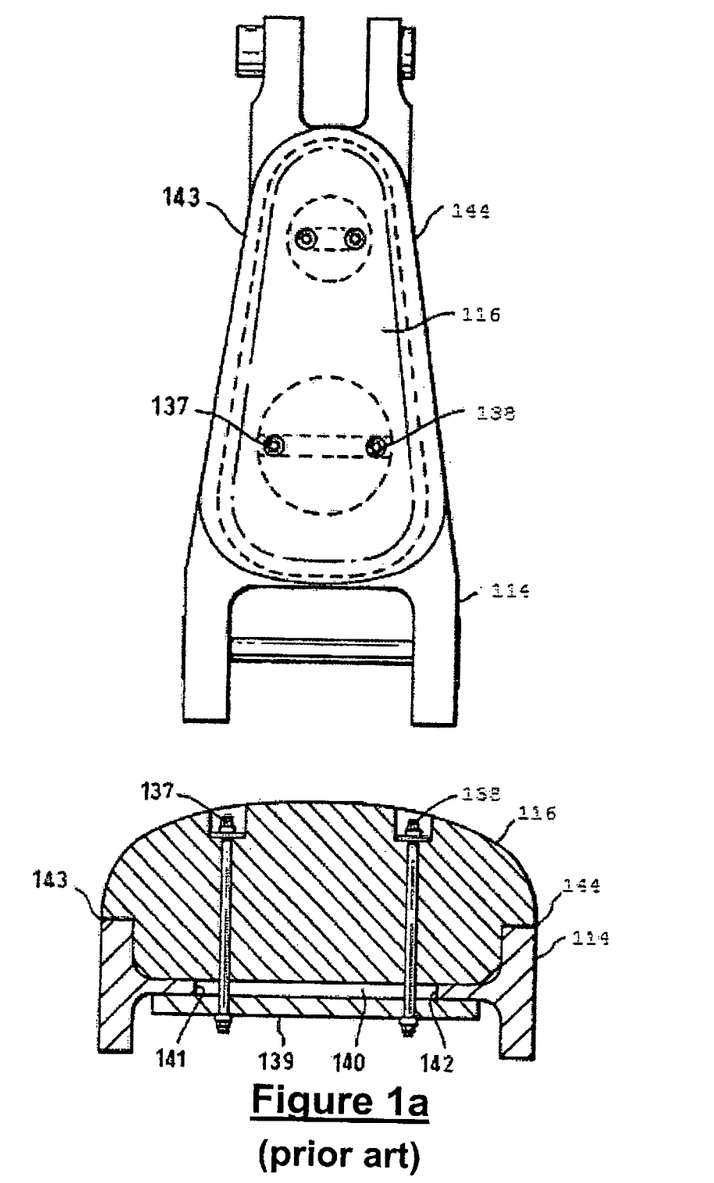
FIG. 1a show embodiments of a prior art torque link shown in WO01/04003.

WO01/04003 describes an aircraft landing gear and apparatus including a plurality of attachments for noise reduction purposes. One such attachment is shown in FIG. 1a, which shows both a plan view and a sectional view of a I-profile torque link 114 with a fairing attachment 116 bolted thereto. The attachment 116 is bolted into position using bolts 137, 138, which pass through the attachment 116 and an accompanying backing plate 139 placed behind the aperture 140 in the torque link 114. Edges 141, 142 defining the aperture 140 are therefore covered by the attachment 116, just as are edges 143, 144. The attachment 116 is a generally domed shape and is shaped to fill completely the aperture 114. The attachment 116 is therefore relatively bulky and needs to be formed of very lightweight material in order not to add significant weight to the landing gear assembly. Very lightweight material is prone to damage and would not, without additional protection, be fitted to the aircraft as a lifetime component. The attachment may need renewing routinely during service. Also, the attachment is attached using standard nuts and bolts, resulting in a fixing arrangement that is not able to be quickly dismantled.

US 2009/0176078 describes a noise-reduction method on an aircraft landing gear when the aircraft is flying and the undercarriage is deployed. The noise that would otherwise be caused by a noise-generating void of a structural element that forms part of the undercarriage is reduced. The method includes coating at least a portion of the structural element in a material that is of lower density than the material of the structural element in order to give the portion an aerodynamically smoother shape. The material completely surrounds at least part of the element and fills completely the noise-generating void of the structural element. The low density material is strengthened and protected by means of a composite material skin. The coating appears not to be removable from the structural element. Visual inspection of the structural element is not therefore easily permitted.

U.S. Pat. No. 6,048,477 discloses an aircraft landing gear component that protects the landing gear leg from debris and acts as a noise reduction fairing. As a result of the dual function of this component, its design is not driven solely by the desire to reduce noise whilst keeping weight and excessive structure to a minimum. The need to enable the component to function as a debris protection device needs also to be considered, which may compromise the design of the component insofar as its noise-reducing function is concerned.

WO 2004/089744 discloses a flexible annular sealing element that fits in the gap between an aircraft wheel tyre and the wheel rim on which the tyre is mounted. The disclosure of WO 2004/089744 provides no guidance on how to reduce noise on parts of the landing gear other than the wheel.

The present invention seeks to mitigate the above-mentioned problems. Alternatively or additionally, the present invention seeks to provide an improved aircraft landing gear noise reduction assembly.

SUMMARY OF THE INVENTION

The present invention provides, according to a first aspect, an aircraft landing gear assembly comprising a landing gear arranged to be moveable between a stowed position and a deployed position, wherein the landing gear assembly includes structure defining a void, and a removably mounted cover plate that covers the void. The cover plate thus enables airframe noise, that would otherwise be generated by the void structure (i.e. the structure defining the void) when the landing gear is deployed, to be reduced by means of a convenient and practical component.

Whilst the cover plate may have a thickness that varies, it preferably has a substantially constant thickness, for example varying by less than +/−10% for 90% of its surface area. Having a substantially constant thickness may simplify design, construction, and fitting and removal of the cover plate. The cover plate is preferably substantially rigid.

The cover plate may have a sealing element extending around the perimeter of the plate. There may be a water draining hole in the cover element, for example in the sealing element. Thus, the cover plate may discourage ingress of moisture, but any moisture that does enter the void may be permitted to drain out via the drainage hole. Providing a drainage hole, or other means of allowing air into the void, also has the benefit of equalising the pressure either side of the cover plate. The sealing element also acts as an acoustic seal. The drainage hole is preferably provided as an acoustically shaped exhaust vent such that the introduction of the hole does not in itself contribute any significant extra noise. The drainage hole is preferably provided at or near the lowermost region of the void, so as to enable water to drain effectively.

The cover plate may have a surface area on its external surface that is greater than 0.005 m$^2$, preferably greater than 0.02 m$^2$ The cover plate may have a surface area on its external surface that is less than 0.8 m$^2$, and possibly less than 0.2 m$^2$ The thickness of the cover plate may be greater than 1 mm. The thickness of the cover plate is preferably less than 10 mm. The maximum degree of curvature (lowest radius of curvature) in the cover may have a radius of curvature of greater than 10 mm.

The cover plate is preferably made as a "good for life" component; that is, the component is manufactured to be of a strength and quality that is intended to last at least as long as the life of the aircraft.

The present invention also provides, according to a second aspect, an aircraft including an aircraft landing gear assembly and cover plate as described herein. A third aspect of the invention provides a cover plate suitable for use as the cover plate of the aircraft landing gear assembly. The invention yet further provides according to a fourth aspect, an aircraft noise reduction void-covering plate having a substantially constant thickness, one or more releasable fixings for fixing the plate over a void, and a sealing element that extends around substantially the entire perimeter of the plate. The fixings are preferably shaped such that when the cover plate is fitted over a void, the fixings are either flush with the cover plate or shielded from the airflow by the cover plate or the surrounding structure.

Preferred (but optional) features of the invention are set out in the dependent claims.

It will be appreciated that features of the present invention described in relation to one aspect of the invention are equally applicable to other aspects of the invention. For example, the fixings of the plate of the fourth aspect may be in the form of the fixings described and/or claimed in connection with the first aspect of the invention.

DESCRIPTION OF THE DRAWINGS

By way of example embodiments of the invention will now be described with reference to the accompanying schematic drawings, of which.

DETAILED DESCRIPTION

The embodiments of the present invention all concern reducing unwanted noise that would otherwise be caused by voids, such as holes, apertures, depressions, and the like that are present in or on the landing gear of a medium- or large-sized commercial aircraft. It will therefore be appreciated that the term "void" encompasses any hole, recess or the like in a structure that may cause unwanted noise. The landing gear of an aircraft of this size, typically of a size able to carry more than 50 seated passengers and having an empty weight of greater than 20 tonnes, is deployed during landing and take-off, but stowed during flight. During approach for landing, airframe noise becomes significant and can dominate over engine noise, particularly for large aircraft. For single aisle aircraft, airframe noise is almost similar to the level of engine noise. A significant amount of airframe noise is created by the deployed landing gear. Landing gear design on small aircraft where the landing gear is fixed in position may include fairings for reducing drag, which may inevitably create less noise. However, inclusion of fairings for aerodynamic efficiency or for drag reduction on stowable landing gear on larger commercial aircraft is uncommon. Of course, when an aircraft is on approach and ready to land it can be advantageous to increase drag on the aircraft.

Figure 1B:
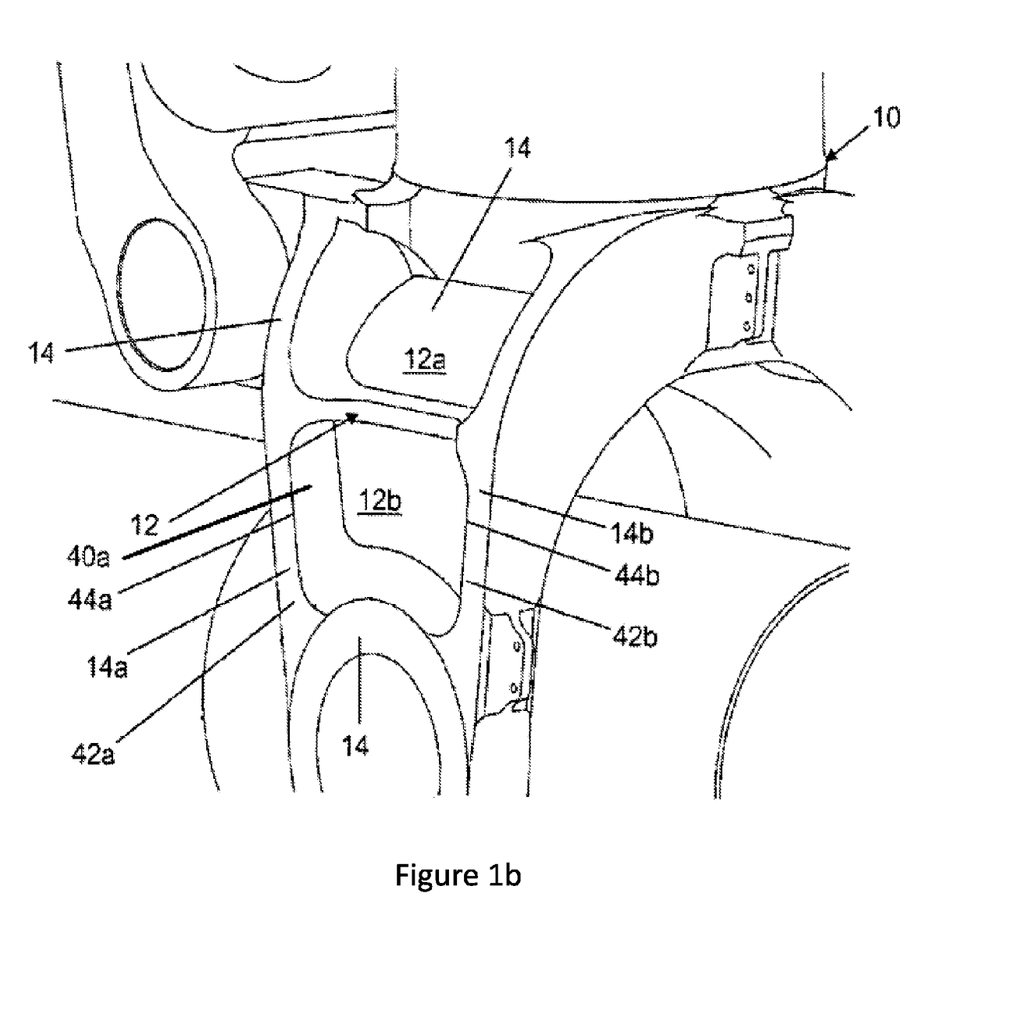
FIG. 1b is a perspective view of part of a nose landing gear leg having forging voids.
Figure 1C:
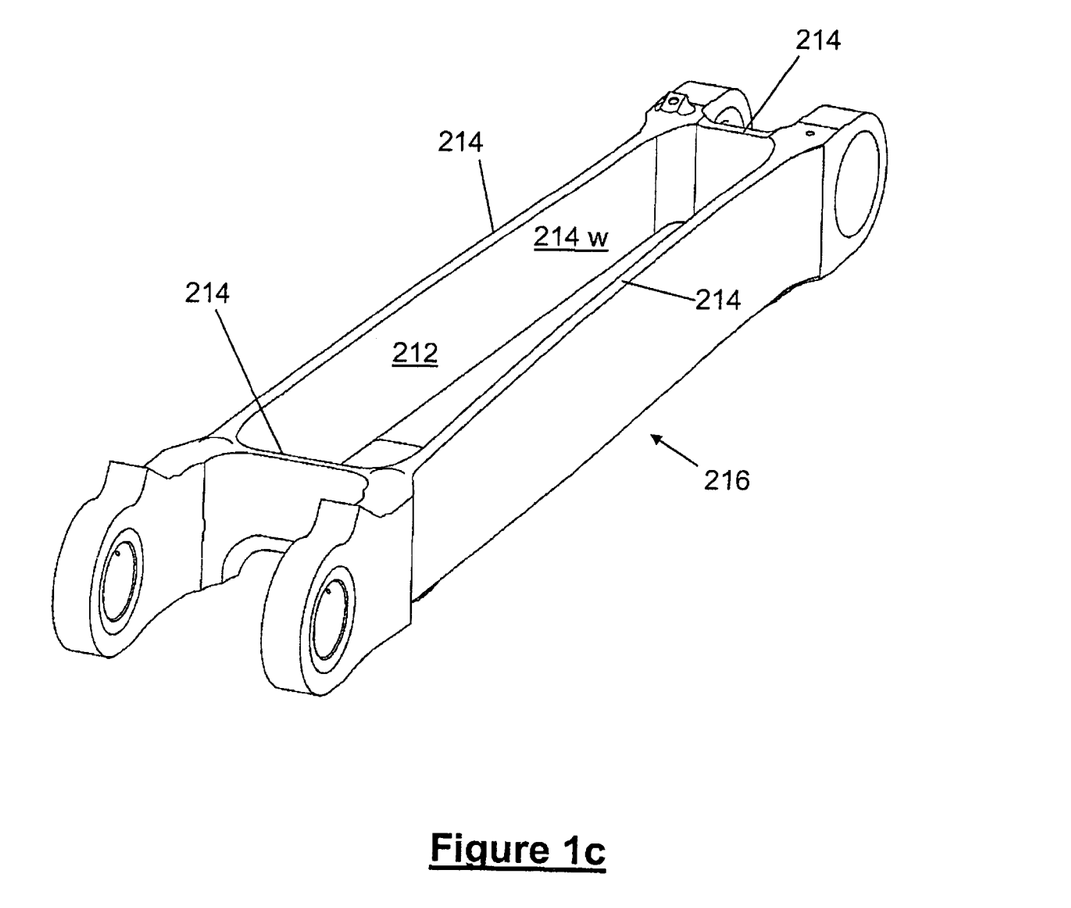
FIG. 1c is a perspective view of a lower side stay having a lightening void.

FIG. 1b shows part of a nose landing gear leg 10 having forging voids 12. Such voids tend to disrupt the airflow and contribute to noise. The two forging voids 12a, 12b shown in FIG. 1b together define a single larger void 12 which is bounded on all four sides by structure 14. FIG. 1c is a perspective view of a lower side stay 216 having a lightening void 212 (a weight-saving void) engineered into the component in order to reduce unnecessary mass on the aircraft. Such a void 212 also generates noise as a result of the interaction of the airflow and the void structure 214 (the "void structure" being those parts of the structure that immediately surround, and therefore define, the void 212).

It will be appreciated that a stowable landing gear is typically provided on an aircraft having a landing gear bay for accommodating the landing gear such that the landing gear is (at least partly, and preferably completely) stowed within the landing gear bay during normal flight. The bay may be closed off by means of one or more bay doors which, when the landing gear is stowed, present an aerodynamic profile.

Figure 2:
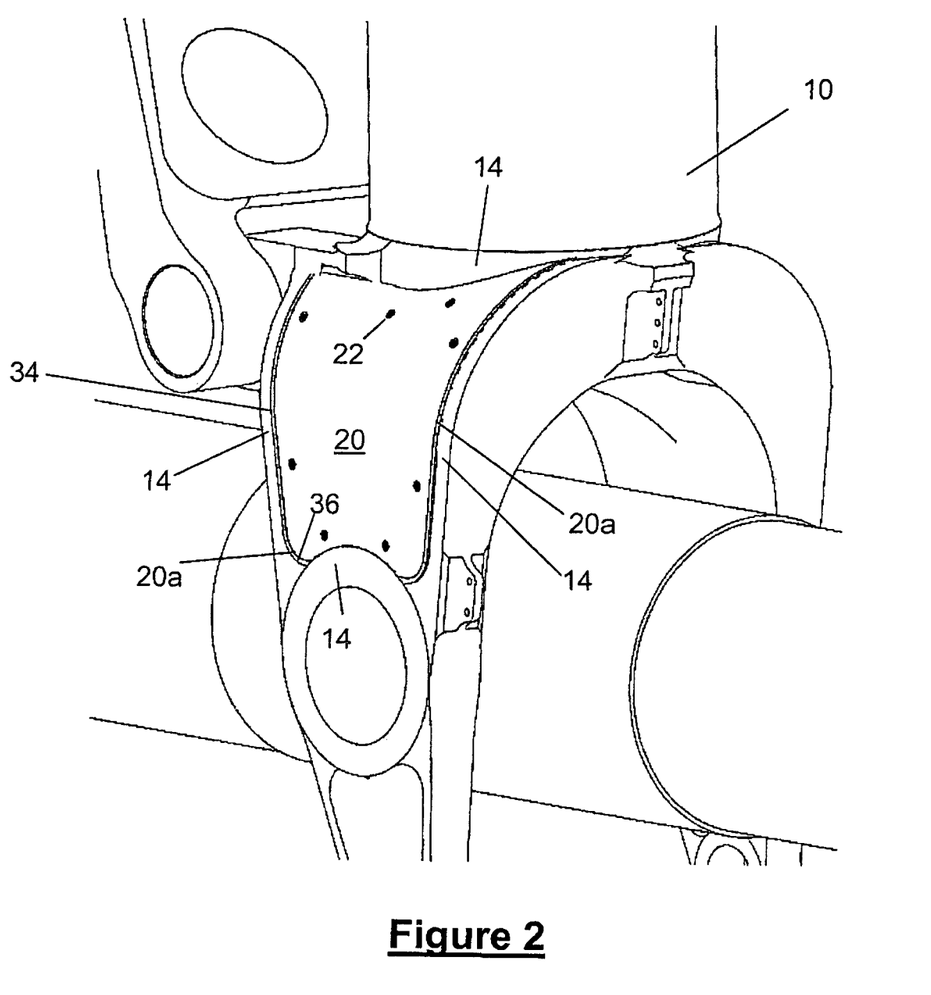
FIG. 2 is a perspective view of part of a nose landing gear leg having a forging void covered by a cover plate according to a first embodiment of the invention.

FIG. 2 shows the nose landing gear leg 10 of FIG. 1b, but with a removably mounted cover plate 20 according to a first embodiment of the invention secured to the structure. The cover plate 20 covers the forging voids 12a, b. The cover plate 20 is shaped to smooth the shape of the structure 14 that immediately surrounds, and therefore defines, the void. Smoothing the shape of the structure reduces noise in flight that would otherwise be caused by the void 12 when the landing gear is deployed. The cover plate 20 has substantially constant thickness and does not fill the void 12 completely. Leaving the void 12 unfilled allows for a simple and lightweight construction of cover plate 20.

Figure 3A:
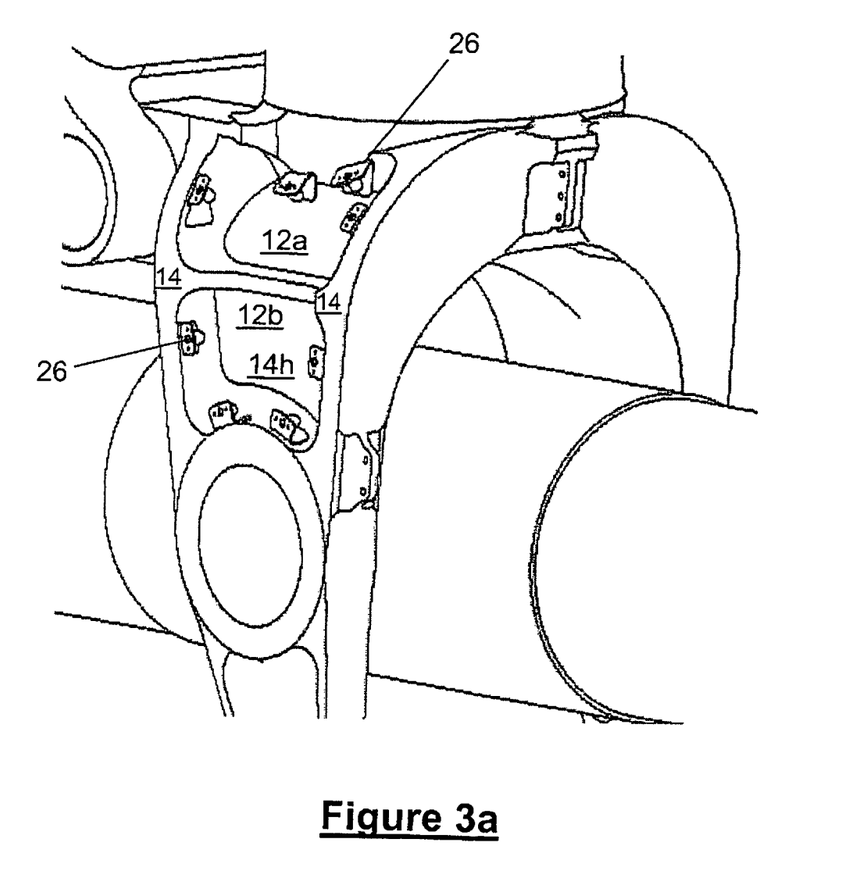
FIG. 3a is a perspective view of part of the nose landing gear leg of FIG. 2, but with the cover plate removed.
Figure 3B:
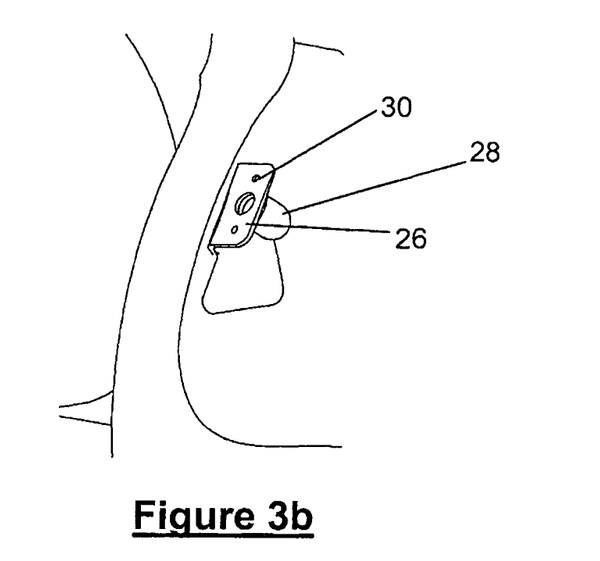
FIG. 3b is an enlarged view of part of FIG. 3a, and shows a fixing bracket.
Figure 3C:
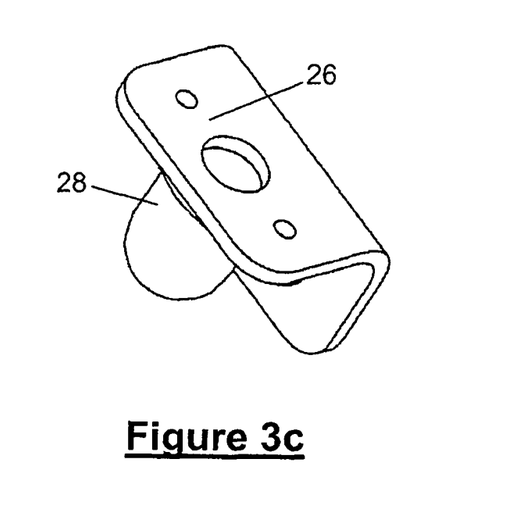
FIGS. 3c and 3d are perspective views of another fixing bracket shown in FIG. 3a, FIG. 4a is a partial view of FIG. 2 showing just the cover plate.
Figure 3D:
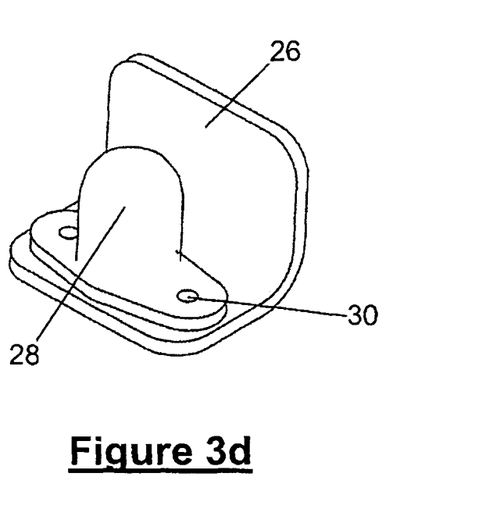
Figure 4A:
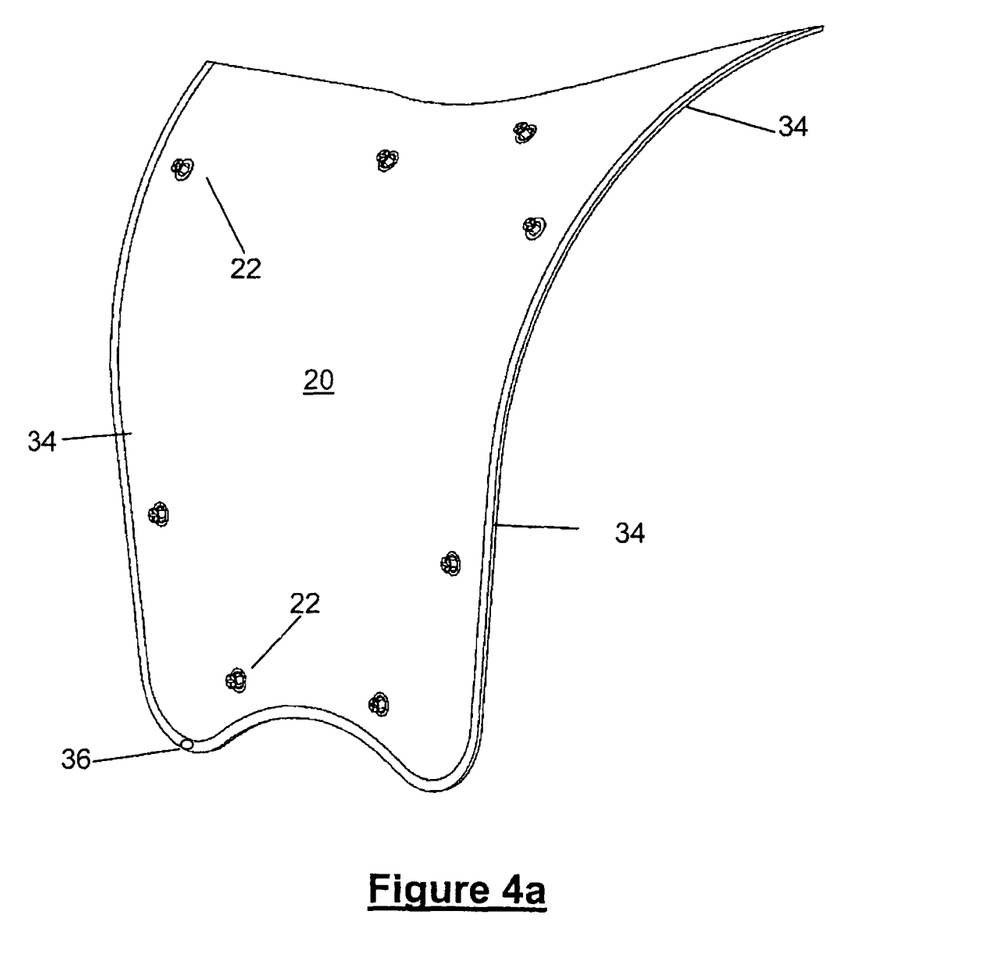
Figure 4B:
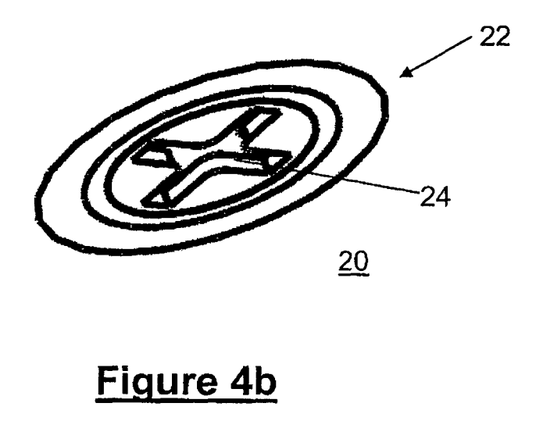
FIG. 4b is an enlarged view of part of FIG. 4a, and shows a fixing element in a locked position.
Figure 4C:
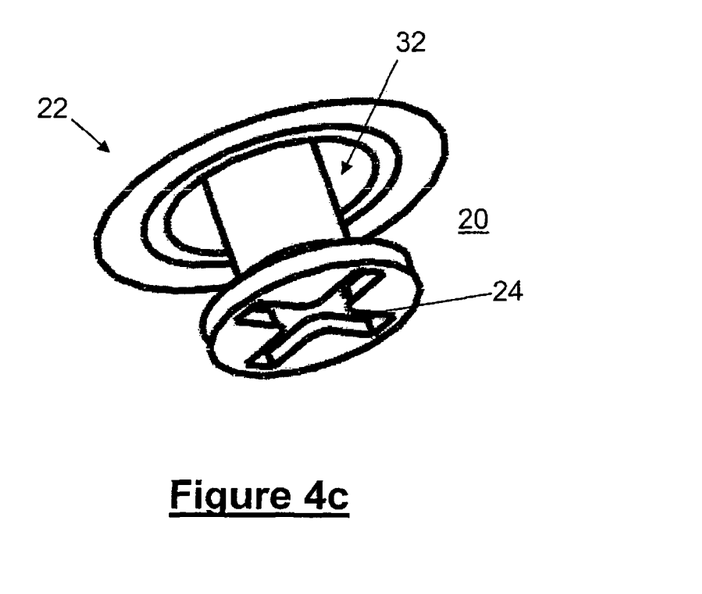
FIG. 4c shows the same view as FIG. 4b, but shows the fixing element in an unlocked position.

The cover plate 20 is fixed in place by quick-operation releasable fixings 22. The cover plate 20 remains fixed in place whether the landing gear is in its stowed position or in its deployed position. The cover plate 20 may however be readily removed, for example to allow for inspection of the void structure 14h otherwise hidden by the cover plate 20, by unfastening the quick-operation fixings 22. FIGS. 3a to 3d and 4a to 4c illustrate the fixings used to fix the cover plate to the void structure. Each fixing 22 comprises a metal fastening stud 24 and a composite bracket 26 including a metal stud receptacle 28, permanently attached to the bracket by countersunk rivets 30. As shown in FIGS. 3a and 3b, each bracket 26 is glued to the void structure in appropriate locations to enable secure attachment of the cover plate 20 to the void structure 14. The stud receptacle 28 and fastening stud 22 are in the form of a spring-loaded ¼-turn quick-operation fixing. The stud 22a has a cross-recessed head (to allow operation by means of a standard cross-head screwdriver) at one end and a transverse pin (not shown in the Figures) at the other end. The stud receptacle 28 includes a cam surface that guides the pin between a locked position and an unlocked position, a quarter turn from the locked position. The spring loading of the quick-operation fixings 22 is provided by means of a spring (not shown) that is mounted between the stud 24 and its receptacle 28. The quick-operation fixing may be substantially the same as the "Camloc"™; ¼-turn quick-operation fasteners available from Alcoa Fastening Systems Fairchild Fasteners Europe—Camloc GmbH (of Kelkheim, Germany). FIGS. 4a to 4c show the arrangement of the fastening studs 24 in relation to the cover plate 20. The cover plate 20 is provided with recessed holes 32 to receive the fastening studs 24. It will thus be seen that each fixing 22 includes a first element, the bracket 26, on the structure and a second element, the stud 24 or the recessed hole 32, on the cover 20.

When the cover plate 20 is secured in place on the void structure 14 and the fastening studs 24 are in the locked position, the stud heads lie flush with the external surface of the cover plate (see FIG. 4b). The fastening studs 24 may be moved to an unlocked position (see FIG. 4c) by means of a quarter turn. When in the unlocked position, the fastening stud 24 protrudes, under the action of the spring loading of the fixing, from the external surface of the cover plate 20. When all fixings are unlocked the cover plate may be removed to allow for inspection of the void.

Figure 6A:
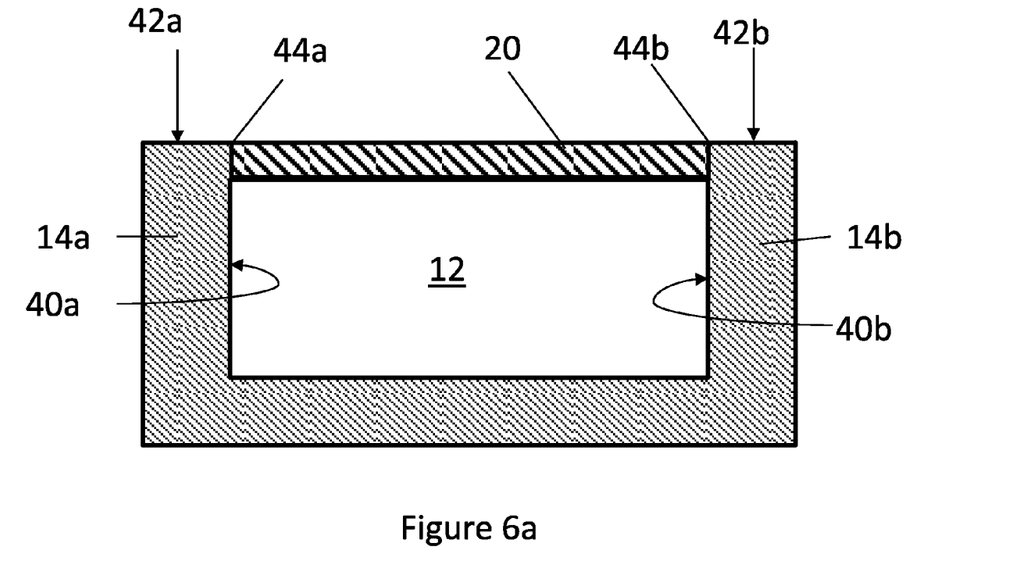
FIGS. 6a and 6b are cross-sectional views of the void and the cover plate in different embodiments.
Figure 6B:
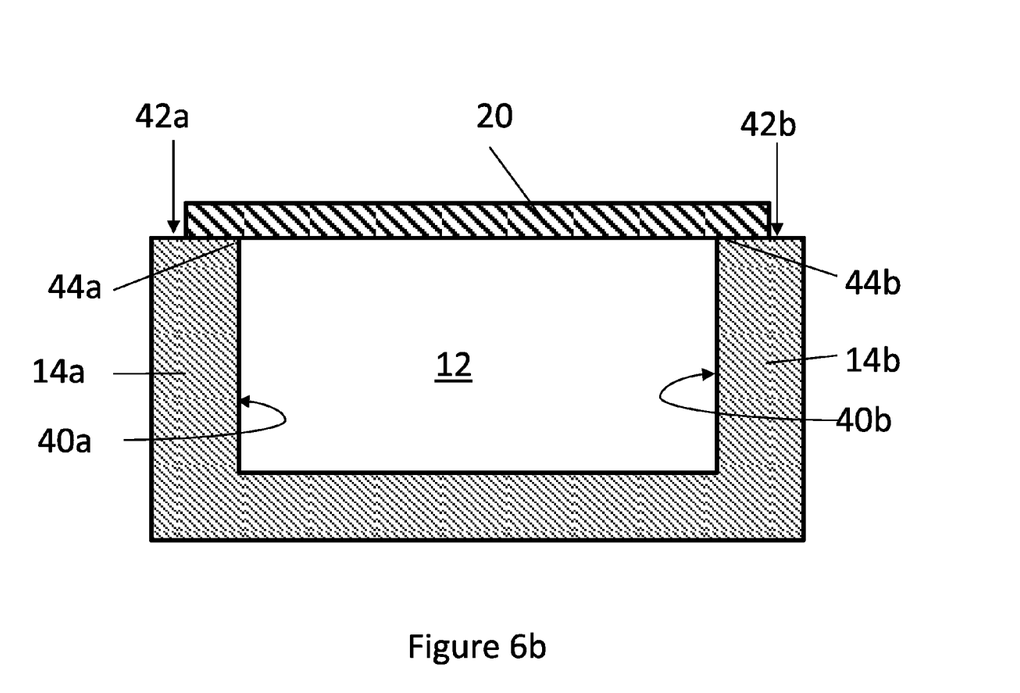

As shown in FIG. 4, the cover plate includes a rubber seal 34 that extends around the edges of the cover plate so that, in use, moisture ingress into the void may be reduced or eliminated. In case, moisture does penetrate through the cover plate, there is provided a small drainage hole 36 within the rubber seal, at the bottom of the cover plate, which allows liquid to drain out of the void. Each cover 20 is formed of composite material, but could be formed of other suitable, strong and lightweight materials, such as aluminium alloy. The seal lies over the void structure, and the cover plate 20 sits slightly proud of the void structure 14, but nonetheless lies substantially flush with the void structure. With reference to Figure 1b, the void structure may be considered as including a first wall 14a having a first surface 40a (side surface) and a second surface 42a (top surface), the side and top surfaces of the first wall meeting to define a first edge 44a. Similarly, the void structure includes a second wall 14b parallel to the first wall 14a. The second wall 14b also has a first surface 40b (side surface) and a second surface 42b (top surface), the side and top surfaces of the second wall meeting to define a second edge 44b. It will be seen from Figure 1b, that the side surfaces 42a, 42b of the first and second walls 14a, 14b define opposite sides of the void 12 that face each other. When the cover plate 20 is secured in position (as shown in FIG. 2), parts of the periphery 20a of the cover plate including its rubber seal 34 lie over the top surfaces 40a, 40b of the first and second walls 14a, 14b, thus covering the first and second edges 44a, 44b. The interrelationship of the void and the cover plate 20 in this embodiment is shown in the cross-sectional view of FIG 6b.

The cover plate 20 shown in FIGS. 2 and 4a has a maximum dimension of about 30 cm and an exterior surface area of about 0.05 m². Its thickness, apart from in the region of the fixings 22, is about 2 mm.

Figure 5:
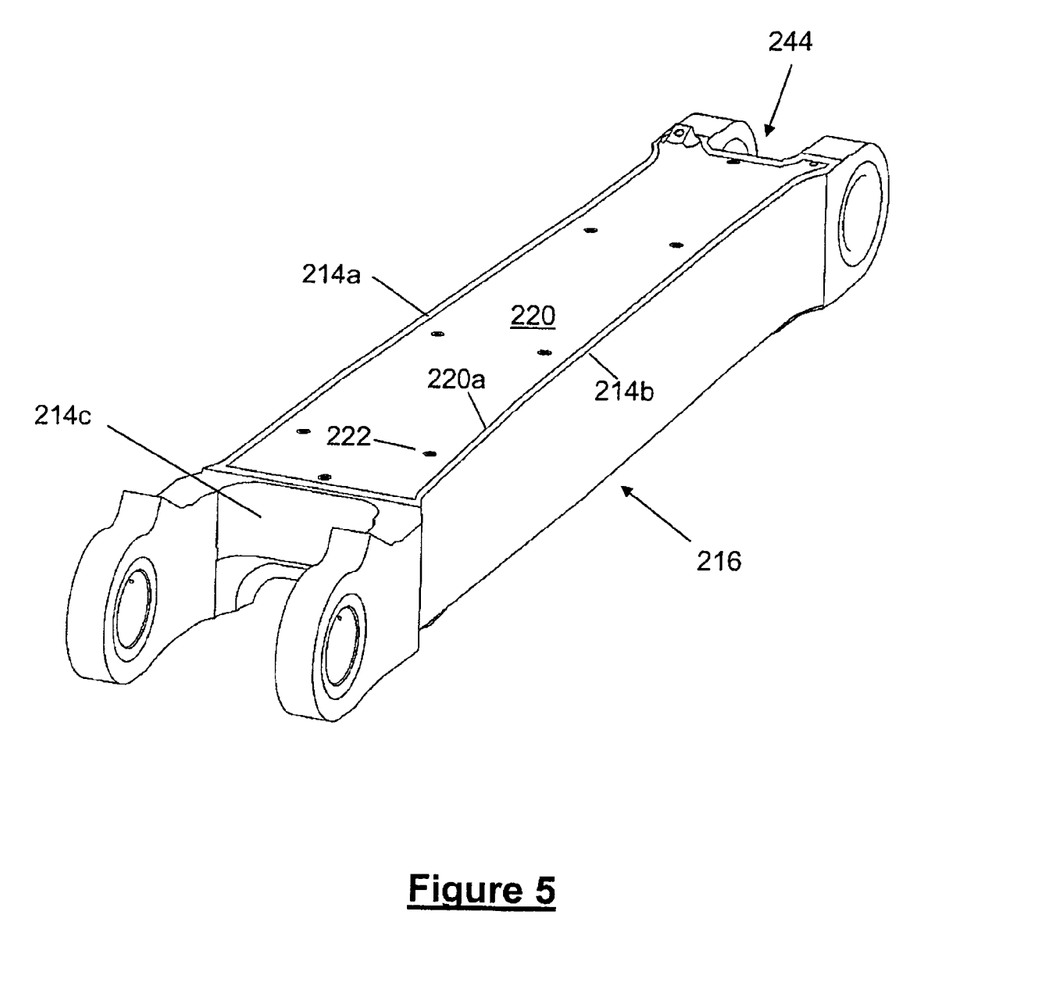
FIG. 5 is a perspective view of part of a lower side stay having a lightening void covered by a cover plate according to a second embodiment of the invention.

FIG. 5 shows a cover plate 220 according to a second embodiment of the invention covering a lightening void 212 in the lower side stay of FIG. 1 c. The cover plate and its quick-operation fixings 222 are of the same construction as that of the first embodiment described above. One difference between the two embodiments, is that in the first embodiment, the void is closed substantially completely by the cover plate, whereas in this embodiment the void 212 is only partially closed. In this case, the void is defined by three walls 214a, 214b, 214c and has an open end 244. The cover plate 220, when secured to the side stay 216, lies over the three walls 214a, b, c, and leaves the "open end" 244 open. The open end 244 is, in use, shielded by other parts of the landing gear so does not contribute significantly to noise-generation. The embodiment of FIG. 2 has a cover plate 20, which has a perimeter 20a that is in contact, along substantially its entire length (i.e. excluding the drainage hole(s)), with the void structure 14. In that embodiment, the region of contact between the void structure 14 and the cover plate 20 may be considered as defining a "closed loop" (the presence of the drainage hole 36 which effectively breaks the loop may be ignored for this purpose). In this second embodiment however, the cover plate 220 leaves a significant part of the void 214 open, and the region of contact between the void structure 214 and the cover plate 220 is clearly not in the form of a closed loop. The interrelationship of the void and the cover plate 20 of the above embodiment is shown in cross-sectional view in FIG. 6a.

The three walls 214a, 214b, 214c, which define the void 212 in the side stay 216, (see FIG. 1c) two load bearing walls 214a, 214b between which there extends a web 214w. The void 212 defined in the region of the web 214w and between the load bearing walls 214a, 214b is a lightening void 212, which is engineered into the component in view of the loading requirements of the side stay 216. The load bearing walls 214a, 214b, which may be considered as defining beams extending in the same general direction, require mass to withstand the expected loads, but the region between the walls (where the web 214w is located) need not be so massive.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

These brackets of the quick-operation fixings could be made from metal and/or composite material depending on required strength, cost and shape. The brackets could be secured in position on the void structure by mechanical fasteners fixed into the component, rather than being bonded in place (although the latter is preferred as this will not affect the strength or integrity of the component being covered). Whilst it is envisaged that the cover plate will be mostly utilised as a retro-fit component it is possible that a cover plate could be incorporated into the design of a new aircraft. In such a case, the brackets of the quick release fixings could be replaced by formations machined, or otherwise formed, in the void structure as part of its design. The brackets may for example be integrally formed with the void structure.

The cover plate may lie completely flush with the void and not extend to cover the top surfaces of the walls defining the void. For example, the cover plate may extend from the first surface (side surface) of the first wall to the first surface (side surface) of the second wall. The cover plate may then lie flush with the second surface (top surface) of the first wall and the second surface (top surface) of the second wall.

The quick operation fixings may not be ¼ turn fixings and could instead by ½ turn fixings. It is preferred that the quick operation fixings require no more one whole turn to move them between the locked and unlocked positions.

It will also be appreciated that voids in other parts of the landing gear assembly may be covered with cover plates in a manner similar to that described above. For example, such parts of the landing gear may include part of the bogie, torque links, side stays, other links, tow bars, or the like. The part of the landing gear defining the void may have an I-profile (sometimes also referred to as an H-profile). The wheels of an aircraft may however be excluded from being considered as a part of the landing gear. The cover plate may be associated with a nose landing gear, a central landing gear, and/or a main landing gear assembly. The cover plate for a side stay may have a length of about 600 mm, a width of about 50 mm and a thickness of about 1.3 mm.

The void structure may itself be made from metal, composite material or a combination of materials. The void structure is however preferably made of the same unitary material. The void structure is preferably substantially monolithic in construction.

In the illustrated embodiments, the outer surface of the cover plate is defined by solid material. Alternatively, part (or possibly all) of the cover plate could be made of mesh or perforated material.

Whilst the noise reduction apparatus of the above embodiments may have benefit on smaller aircraft, the present invention is of greater application to medium to large commercial aircraft. The aircraft is preferably heavier than 20 tonnes dry weight, and more preferably heavier than 100 tonnes dry weight. The aircraft is preferably of a size equivalent to an aircraft designed to carry more than 50 passengers, and more preferably more than 200 passengers.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft landing gear assembly comprising:
a landing gear arranged to be moveable between a stowed position and a deployed position, wherein the landing gear assembly includes landing gear structure carrying aircraft landing loads, said structure including at least one void having a volume, and where the at least one void is defined at least in part by two walls in the structure, each wall having an edge defining at least in part a rim of the at least one void; and
a removably mounted cover plate that substantially overlies and closes off the at least one void, wherein the removably mounted cover plate extends to the two walls or over the edges of the two walls, and wherein the cover plate covers the void without filling a majority of the volume of the at least one void.

2. The aircraft landing gear assembly according to claim 1, wherein the cover plate does not protrude into the volume of the at least one void.

3. The aircraft landing gear assembly according to claim 1, wherein the cover plate has a substantially constant thickness.

4. The aircraft landing gear assembly according to claim 1, wherein the cover plate includes a sealing element extending around the perimeter of the plate, and the sealing element abuts the surfaces of the structure.

5. The aircraft landing gear assembly according to claim 1, wherein the cover plate includes a water draining hole.

6. The aircraft landing gear assembly according to claim 5, wherein the water draining hole is formed a sealing element extending around the perimeter of the plate, wherein the sealing element abuts the surfaces of the structure.

7. An aircraft landing gear assembly comprising:
a landing gear arranged to be moveable between a stowed position and a deployed position, wherein the landing gear includes a load bearing structure;
a void in the load bearing structure, and
a removably mounted cover plate that covers the void, wherein
the load bearing structure defining the void includes a first wall having a first surface and a second surface, the first and second surfaces of the first wall meeting to define an edge of the first wall, and a second wall having a first surface and a second surface, the first and second surfaces of the second wall meeting to define an edge of the second wall, the first surface of the first wall defining a first side of the void, the first surface of the second wall defining a second side of the void, the first surface of the first wall facing, and being opposite to, the first surface of the second wall, and
the cover plate extends over the void, is substantially flush with the second surface of the first wall and the second surface of the second wall, and does not completely fill the void.

8. An aircraft landing gear assembly comprising a landing gear arranged to be moveable between a stowed position and a deployed position, wherein
the landing gear assembly includes structure defining a void, wherein the structure defining the void includes a first wall having a first surface and a second surface, the first and second surfaces of the first wall meeting to define an edge of the first wall, and a second wall having a first surface and a second surface, the first and second surfaces of the second wall meeting to define an edge of the second wall, the first surface of the first wall defining a first side of the void, the first surface of the second wall defining a second side of the void, the first surface of the first wall facing, and being opposite to, the first surface of the second wall, and
a removably mounted cover plate overlying the edges of the first wall and the second wall, wherein the removably mounted cover plate rests against the second surfaces of the first and second walls, the cover plate covers without completely filling the void.

9. The aircraft landing gear assembly according to claim 1, wherein the structure defining the void comprises at least two structural elements each arranged to bear a portion of said aircraft landing loads.

10. The aircraft landing gear assembly according to claim 1, wherein a region of contact between the structure and the cover plate defines a closed loop.

11. The aircraft landing gear assembly according to claim 1, wherein the cover is removably attached to the structure by a plurality of fixings, each fixing including a first element on the structure and a second element on the cover.

12. The aircraft landing gear assembly according to claim 11, wherein the first element is in the form of a bracket.

13. The aircraft landing gear assembly according to claim 11, wherein the first element is fixed to the structure by means of an adhesive.

14. The aircraft landing gear assembly according to claim 11, wherein each fixing is in the form of a quick-operation fixing.

15. An aircraft including an aircraft landing gear assembly according to claim 1.

16. The aircraft landing gear assembly according to claim 4, wherein the cover plate is a noise reduction cover plate, said cover plate having a substantially constant thickness and the assembly comprises one or more releasable fixings for fixing the plate to the surfaces of the structure.

17. An aircraft landing gear assembly comprising:
a landing gear arranged to be moveable between a stowed position and a deployed position, wherein the landing gear assembly includes landing gear structure carrying aircraft landing loads, said structure including at least one void having a volume, wherein the structure defining the at least one void includes a first wall having a first surface and a second surface, the first and second surfaces of the first wall meeting to define an edge of the first wall, and a second wall having a first surface and a second surface, the first and second surfaces of the second wall meeting to define an edge of the second wall, the first surface of the first wall defining a first side of the void, the first surface of the second wall defining a second side of the void, the first surface of the first wall facing, and being opposite to, the first surface of the second wall, and
a removably mounted cover plate that substantially covers the at least one void, said cover plate having a perimeter which extends to the first surfaces or extends over the second surfaces of the first and second walls, wherein the removably mounted cover plate contacts the second surfaces along a majority of the perimeter of the cover plate, the removably mounted cover plate extends from the first wall, over the void and to the second wall, and the cover plate covers without filling a majority of the volume of the at least one void.

18. The aircraft landing gear assembly according to claim 17, wherein the cover plate extends from the first surface of the first wall to the first surface of the second wall and is substantially flush with the second surface of the first wall and the second surface of the second wall.

19. The aircraft landing gear assembly according to claim 17, wherein the cover plate extends from the second surface of the first wall to the second surface of the second wall and covers said edge of the first wall and said edge of the second wall.

20. The aircraft landing gear assembly according to claim 1, wherein at least part of the cover plate is located within the void.

* * * * *